US009785459B2

(12) United States Patent
Tsirkin et al.

(10) Patent No.: US 9,785,459 B2
(45) Date of Patent: Oct. 10, 2017

(54) MANAGED NETWORK FILTER/FORWARD PROGRAMMING IN A VIRTUALIZATION SYSTEM BY AN AGENT MORE PRIVILEGED THAN THE HYPERVISOR

(75) Inventors: Michael Tsirkin, Yokneam Yillit (IL); Roni Luxenberg, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 783 days.

(21) Appl. No.: 13/214,891

(22) Filed: Aug. 22, 2011

(65) Prior Publication Data
US 2013/0055242 A1 Feb. 28, 2013

(51) Int. Cl.
G06F 9/46 (2006.01)
G06F 9/455 (2006.01)
H04L 29/06 (2006.01)

(52) U.S. Cl.
CPC .......... *G06F 9/45558* (2013.01); *H04L 63/20* (2013.01); *G06F 2009/45595* (2013.01)

(58) Field of Classification Search
CPC .................................................. G06F 9/5077
See application file for complete search history.

(56) References Cited

U.S. PATENT DOCUMENTS

| 2008/0022376 A1* | 1/2008 | Ke et al. ........................... 726/5 |
| 2008/0043756 A1* | 2/2008 | Droux et al. ................. 370/399 |
| 2012/0304175 A1* | 11/2012 | Damola .............. G06F 11/3419 718/1 |

OTHER PUBLICATIONS

Libvirt: Wiki: VirtualNetworking, "Virtual Networking, How the virtual networks used by guests work," 17 pages, wiki.libvirt.org/page/VirtualNetworking, [retrieved on Aug. 22, 2011].
Berrange, Daniel P.,"[libvirt] FYI: a short guide to libvirt & network filtering iptables/ebtables use," 6 pages, redhat.com/archives/libvirt-list/2010-June/msg00762.html, [retrieved on Mar. 15, 2011].
Libvirt: Network Filters, "Network Filters," 1 page, ibvirt.org/formatnwfilter.html, [retrieved on Jun. 27, 2011].

* cited by examiner

*Primary Examiner* — Bradley Teets
(74) *Attorney, Agent, or Firm* — Lowenstein Sandler LLP

(57) ABSTRACT

A mechanism for managed network filter/forward programming in a virtualization system is disclosed. A method of the invention includes receiving a network programming request from a hypervisor managing a virtual machine (VM), wherein the hypervisor intercepted the network programming request from the VM, determining whether the network programming request satisfies an administrative network policy, and updating network configuration settings as requested by the network programming request if the network programming request satisfies the administrative network policy, wherein the updating occurs without restarting the VM.

19 Claims, 4 Drawing Sheets

MANAGED NETWORK FILTER/FORWARD PROGRAMMING IN A VIRTUALIZATION SYSTEM BY AN AGENT MORE PRIVILEGED THAN THE HYPERVISOR

TECHNICAL FIELD

The embodiments of the invention relate generally to virtualization systems and, more specifically, relate to a mechanism for managed network filter/forward programming in a virtualization system.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

A VM is generally capable of sending and/or receiving network traffic by utilizing a virtual network switch (i.e., a bridge device) on the host machine providing the VM. The VM can "plug in" to this virtual network switch and direct its network traffic through this device. This virtual network switch may show up as a network interface of the host machine having a corresponding virtual network driver.

A virtualization system administrator may seek to configure and enforce network filtering and forwarding programming rules on the VM and manage parameters of the network traffic that the VM is allowed to send and/or receive through the virtual network switch. Because the filtering/forwarding programming rules cannot be circumvented from within the VM, it makes them mandatory from the point of view of a VM user.

Currently, there are two modes of operation of a virtualization system in terms of network filtering programming. The first operating mode includes allowing the hypervisor (and thereby the VMs managed by that hypervisor) to perform any type of networking programming. In other words, any type of request from the VM can be transmitted and received. Although very flexible, this mode of operation has security and performance implications.

The second operating module includes a component separate from the VM setting up the networking parameters for the VM and not allowing the VM to request or make any networking configuration changes. In this way, the VM is disconnected from all networking decisions. The network configuration of the host is set up by the separate networking component, and then the VM's network is set up to match which the VM is started. If any configuration changes are made to the VM's network, then its networking will not work. This second operation mode provides better security and performance than the first operating mode, but is very strict and the ability to program the network from the VM (which can be an important and competitive key feature of VMs) is lost.

In terms of network forwarding programming, a host machine may be currently responsible for forwarding a packet when it arrives at the host machine to an application on the host machine or to one or more of the VMs hosted by the host machine. Currently, the host machine can "learn" which packets should be forwarded to which location by snooping on the outgoing packets from the VMs: the source address or the data portion of the outgoing packets give the address that the host machine should forward a return packet. These snooping results may be stored in a forwarding table on the host machine for each port (e.g., VM, host, external host, etc.). When a packet arrives, the host machine may look up the destination address in the table to determine where the packet should be forwarded (i.e., which VM, which host machine, all or none of the above). This form of packet forwarding using learning/snooping logic places high CPU load on the host machine.

BRIEF DESCRIPTION OF THE DRAWINGS

Embodiments of the invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
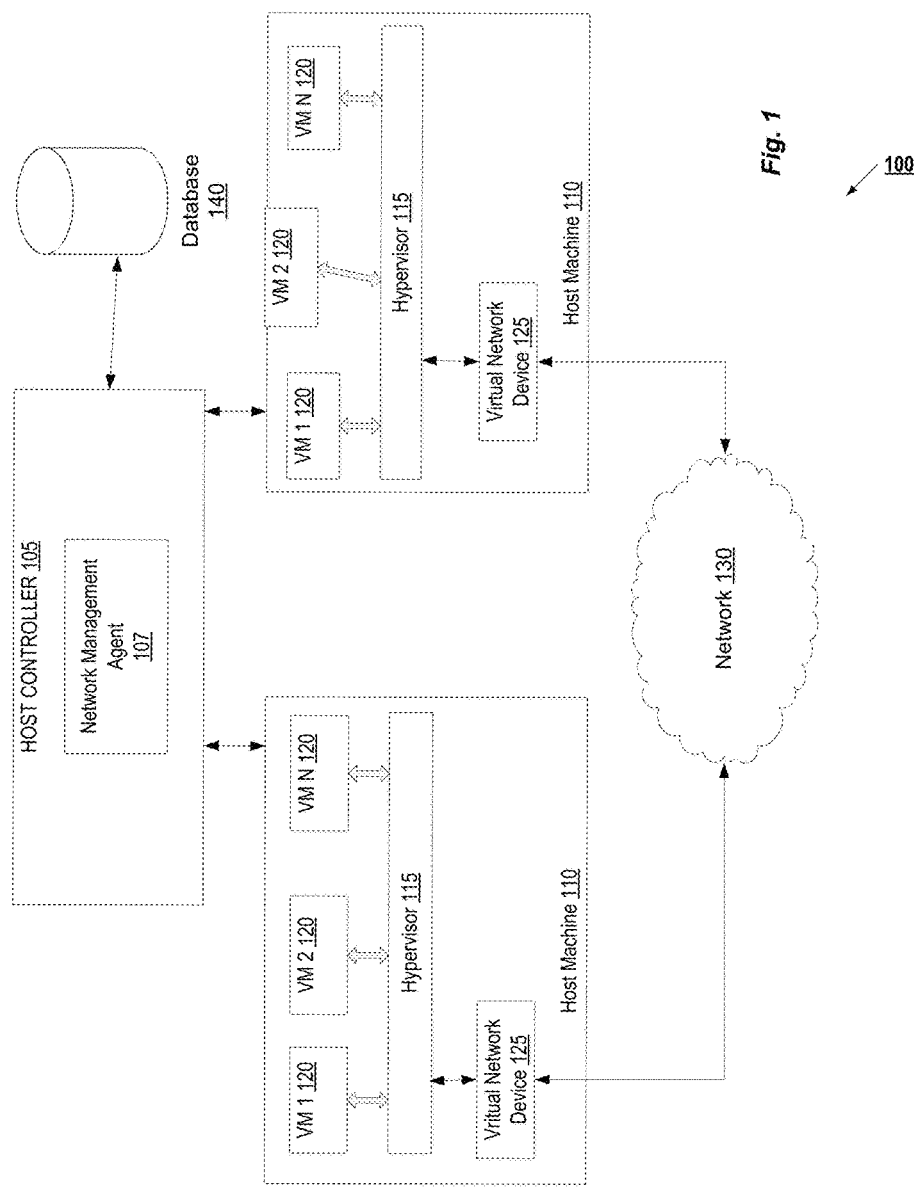
FIG. 1 is a block diagram of a virtualization system performing managed network filtering/forwarding programming according to an embodiment of the invention.

Embodiments of the invention provide for mechanism for managed network filter/forward programming in a virtualization system. A method of embodiments of the invention includes receiving a network programming request from a hypervisor managing a virtual machine (VM), wherein the hypervisor intercepted the network programming request from the VM, determining whether the network programming request satisfies an administrative network policy, and updating network configuration settings as requested by the network programming request if the network programming request satisfies the administrative network policy, wherein the updating occurs without restarting the VM.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "determining", "updating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for managed network filter/forward programming in a virtualization system. Embodiments of the invention introduce a privileged management module for networking policy that may be located at the host machine or host controller. When a VM tries to make a networking configuration change, this request is intercepted by hypervisor and sent to the privileged management module for networking policy. This privileged management module evaluates the VM networking request based on a predetermined policy regarding networking and ensures that the request complies with the policy. In the same way as filtering/forwarding programming is automated, forwarding programming is also automated in embodiments of the invention. Specifically, a host machine builds a forwarding table for a given VM based on what the privileged management module provides to the host machine after the administrative policies are applied. Embodiments of the invention eliminate any need for snooping and learning logic to oversee network configuration changes, with respect to filtering and forwarding, by a VM.

FIG. 1 is a block diagram of a virtualization system 100 performing managed network filtering/forwarding programming according to an embodiment of the invention. In one embodiment, virtualization system 100 includes a one or more host machines 110 coupled to a network 130. The network 130 may be a private network (e.g., a local area network (LAN), a wide area network (WAN), intranet, etc.) or a public network (e.g., the Internet). In one embodiment, host machine 110 may also be known as a host computing device. Typically, host machine 110 includes at least a processor and a memory. In some cases, host machine 110 may be a server computing device.

As shown, host machine 110 may run one or more VMs 120. Each VM 120 runs a guest operating system (OS) that may be different from one VM to another. The guest OS may include, but is not limited to, Linux™, Microsoft™ Windows™, Solaris™ Macintosh™ OS, and so on. Furthermore, host machine 110 may include a hypervisor 115 that emulates the underlying hardware platform of host machine 110 for the VMs 120 that it hosts. The hypervisor 115 may also be known as a virtual machine monitor (VMM) or a kernel-based hypervisor. In some embodiments, the hypervisor 115 is part of a host operating system.

In one embodiment, each VM 120 can be accessed by one or more of clients (not shown) over the network 130. In one scenario, each VM 120 provides a virtual desktop for the client. The virtual desktop may be viewable by an end user of the client. From the end user's point of view, the virtual desktop functions as a physical desktop (e.g., a personal computer) and is indistinguishable from a physical desktop.

As illustrated, the host machine 110 may be coupled to a host controller 105 (via a network or directly). In some embodiments, the host controller 105 may reside on a designated computer system (e.g., a server computer, a desktop computer, etc.) or be part of the host machine 110 or another machine. VMs 120 may be managed by the host controller 105, which may add a VM, delete a VM, balance the load on the server cluster, provide directory service to the VMs 120, and perform other management functions.

Host machine 110 may also include a virtual network device 125. Virtual network device 125 may be a virtual switch, a bridge device, or a physical network device that are each capable of sending and/or receiving network traffic over network 130 and/or between VMs 120 on the same host machine 110. Furthermore, virtual network device 125 is capable of supporting multiple VMs 120. Each VM 120 on host machine 110 can "plug in" to this virtual network device 125 and direct its network traffic through this device 125. In some embodiments, the virtual network device 125 may show up as a network interface of the host machine 110 and may also have a corresponding virtual network driver.

Often times, a virtualization system administrator may seek to configure and enforce network filtering/forwarding programming on the VM 120 and manage parameters of the network traffic that the VM 120 is allowed to send and/or receive through the virtual network device 125. For example, network filtering rules might require that the MAC address is unique in the network to avoid conflicting with another device on the same network. In another example, the rules may allow a privileged VM 120 to observe traffic destined to other VMs or other destinations on the same LAN. In a further example, the rules may allow an administrator to place limits on other network parameters of the virtual network device 125, such as packet coalescing or quality of service, which affects traffic coming on and out of the VM 120. Furthermore, network forwarding rules may govern where a received packet may be forwarded onto, such as which VM, which host machine, etc.

To aid in the creation and enforcement of network filtering/forwarding programming, virtualization system 100 may include a network management agent 107 that manages the networking functions on the host machine 110. As illustrated in FIG. 1, the network management agent 107 may reside on the host controller 105. However, network management agent 107 is not limited to operating on the host controller 105, and may operate on any host machine 110 in system 100, or on a separate device from the host controller 105 and host machines 110.

In embodiments of the invention, network management agent 107 is more privileged than the hypervisor 115 of any host machine 110, so that the network management agent 107 can perform actions like managing networking in the host machine 110 and is also able to see other multiple hypervisors 115 residing on the same host (or multiple VMs 120). Network management agent 107 is used to receive forwarded network programming requests from a VM 120 and to verify that these packets satisfy a network policy provided by an administrator of the virtualization system 100. For example, the programming request might modify the MAC address used by the VM 120 to send and receive packets. Subsequently, only traffic matching the specific address is allowed for this VM 120.

The network policy may include, but is not limited to, rules regarding MAC addresses that are allowed for particular VMs 120, designation of VLAN addresses to particular VMs 120, rules regarding multicasting and uni-casting from VMs 120, and verifying conflicts between VMs 120 on a specific host 120 (e.g., same unicast MAC address, etc.).

The network management agent 107 of embodiments of the invention acts as a privileged component between the VM 120/hypervisor 115 and the host machine 110, that enforces network filter/forward programming rules, while allowing the VM 120 to maintain control of networking configuration changes and modifications. As such, network management 107 eliminates the need to have learning logic in the virtual network device 125, which requires the need to snoop the traffic to learn MAC addresses and multicast addresses, among other things.

In one embodiment, whenever a VM 120 programs network modifications or configuration changes, these programming requests are not passed from the hypervisor 115 to the host machine 110 (to program the virtual network device 125), but instead are passed to the network management agent 107 (in the case of FIG. 1, to the network management agent 107 on the host controller 105). The network management agent 107 then verifies that the programming request does not violate any network filtering/forwarding programming rules of administrative network policy maintained by the network management agent 107. In one embodiment, the administrative network policy may be stored in database 140 communicably coupled to host controller 105. If successfully verified, then the network management agent 107 may then perform the programming requested by the VM 120 in the packets on the virtual network device 125.

If the programming request does not satisfy the administrative network policy, then at a minimum the programming request from the VM 120 is ignored by the network management agent 107 so that it will have no effect. In other embodiments, the network management agent 107 may notify the VM 120 that its programming request was denied and a reason for the denial.

Similar to network filtering, network forwarding programming is automated by the network management agent 107. Specifically, a host machine 110 builds a forwarding table for a given VM based on what the network management agent 107 provides to the host machine after the administrative policies are applied. Building forwarding/filtering tables directly from the VM (by looking at outgoing packets) is disabled at the host machine 110.

As a result, embodiments of the invention allow the VM to request and make network configuration changes and modifications, while maintaining a separation policy-wise between the hypervisor 115 and management of the virtualization system 100. The network programming is VM-controlled, but administrator-verified.

Figure 2:
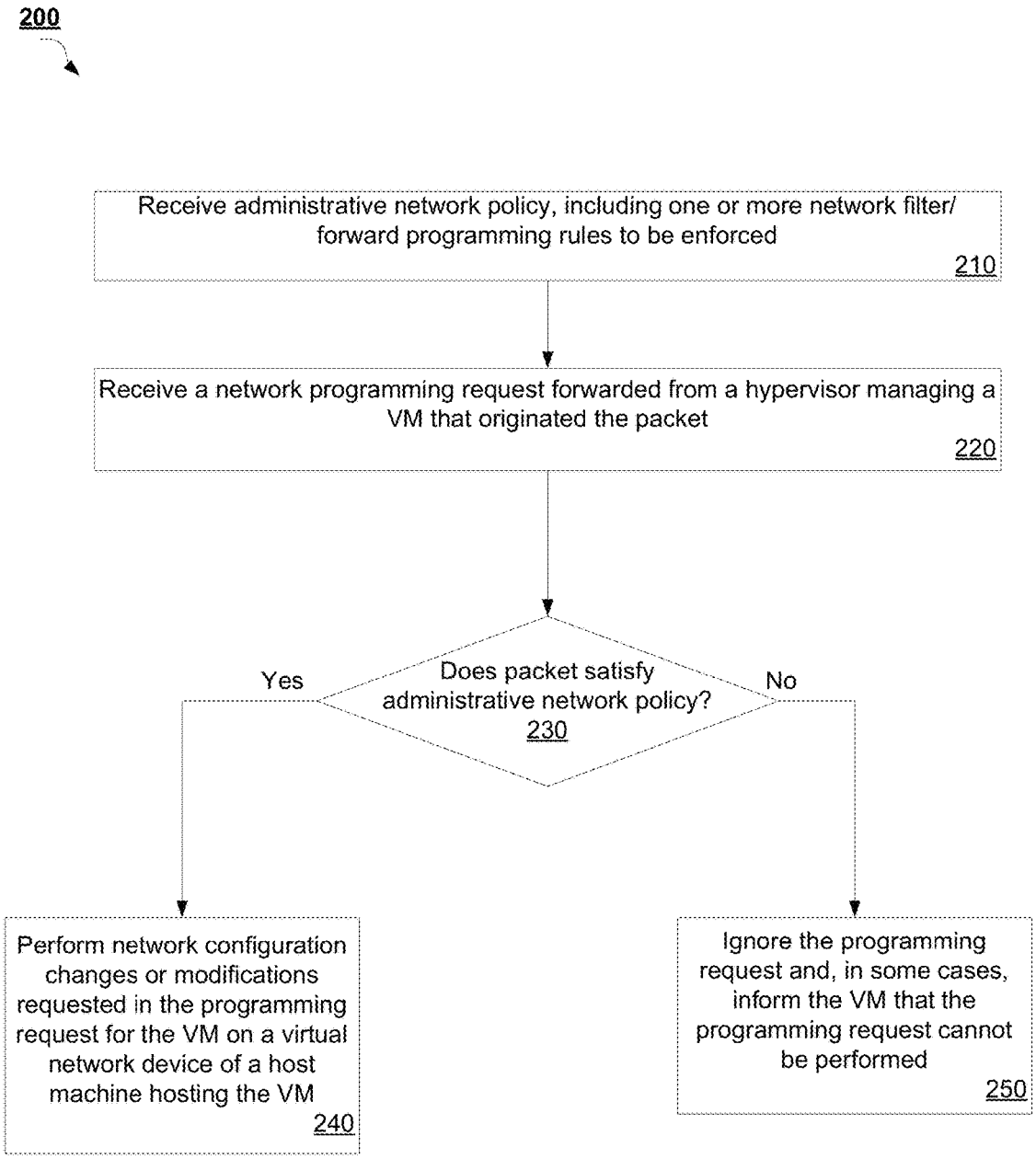
FIG. 2 is a flow diagram illustrating a method, performed by a network management agent, for managed network filter/forward programming in a virtualization system according to an embodiment of the invention.

FIG. 2 is a flow diagram illustrating a method 200, performed by a network management agent, for managed network filter/forward programming in a virtualization system according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by network management agent 107 of host controller 107 of FIG. 1.

Method 200 begins at block 210 where an administrative network policy is received at the network management agent. In one embodiment, the administrative network policy includes one or more network filter/forward rules to be enforced by the network management agent. The policy may be created by an administrator of a virtualization system of the network management agent. The network policy may include, but is not limited to, rules regarding MAC addresses that are allowed for particular VMs 120, designation of VLAN addresses to particular VMs 120, rules regarding multi-casting and uni-casting from VMs 120, and verifying conflicts between VMs 120 on a specific host 120 (e.g., same unicast MAC address, etc.).

At block 220, a network programming request that is forwarded from a hypervisor is received at the network management agent. The network programming request originated from a VM that the hypervisor manages. The hypervisor intercepts the request from the VM, and upon determining that the request is directed to network configuration changes or modifications, forwards it on to the network management agent. At decision block 230, the network management agent determines whether the request satisfies the administrative network policy. In other words, the network management agent determines whether the request violates any of the network filter/forward rules of the administrative network policy.

If the request satisfies the administrative network policy at block 230, then method 200 continues to block 240, where the network configuration changes or modifications requested in the packets are performed by the network management agent. In one embodiment, the network management agent makes the requested changes or modifications at a virtual network device of a host machine that virtualizes its resources for the VM. On the other hand, if the request does not satisfy the administrative network policy at block 230, then method 200 proceeds to block 250 where the network management agent ignores the programming request from the VM, and, in some embodiments, informs the VM that the programming request cannot be performed.

Figure 3:
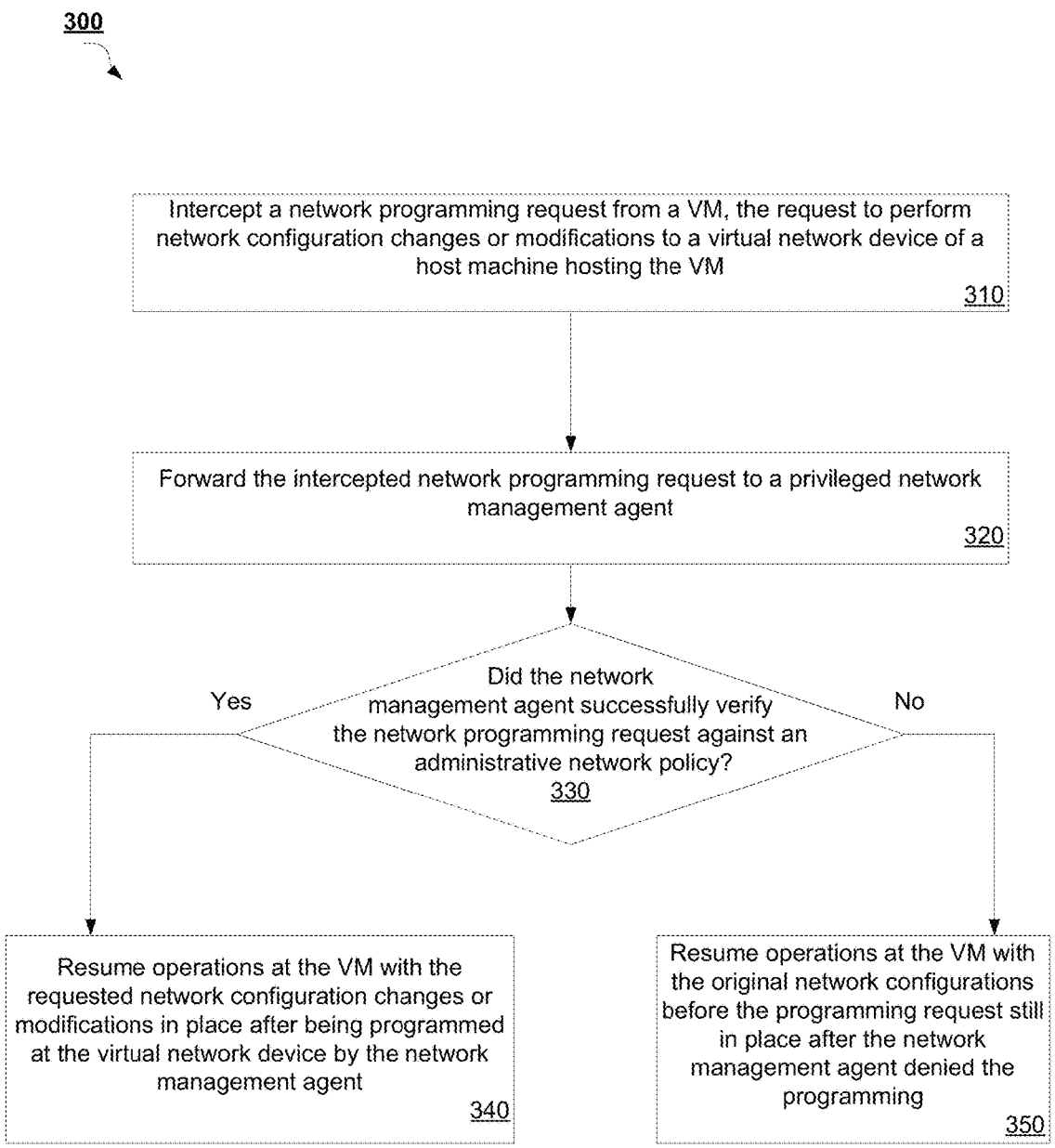
FIG. 3 is a flow diagram illustrating a method, performed by a hypervisor of a host machine, for managed network filter/forward programming in a virtualization system according to an embodiment of the invention.

FIG. 3 is a flow diagram illustrating a method 300, performed by a hypervisor of a host machine, for managed network filter/forward programming in a virtualization system according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by hypervisor 115 of host machine 110 of FIG. 1.

Method 300 begins at block 310 where a network programming request originating from a VM is intercepted by a hypervisor managing the VM. The network programming request is a request to perform network configuration changes or modification to a virtual network device of a host machine hosting the hypervisor and VM. Then, at block 320, the intercepted network programming request is forwarded to a privileged network management agent. In one embodiment, the network management agent is part of a host controller, managing one or more host machines in a virtualization system including the host machine having the hypervisor and VM. The network management agent is more privileged than the hypervisor or host machine and is allowed to perform network configuration changes and modifications in the virtualization system.

Subsequently, at decision block 330, the hypervisor determines whether the network management agent successfully verified the network programming request against an administrative network policy. In one embodiment, the administrative network policy includes one or more network filter/forward rules to be enforced by the network management agent. The policy may be created by an administrator of a virtualization system of the network management agent. The network policy may include, but is not limited to, rules regarding MAC addresses that are allowed for particular VMs 120, designation of VLAN addresses to particular VMs 120, rules regarding multi-casting and uni-casting from VMs 120, and verifying conflicts between VMs 120 on a specific host 120 (e.g., same unicast MAC address, etc.).

In one embodiment, the hypervisor may receive a message from the network management agent indicating success or failure of the network programming request. If the network programming request was successfully verified, then the operations of the VM are resumed with the requested networking configuration changes or modifications in place at block 340. The network changes or modifications will have been performed by the network management agent upon determining that the VM network programming request satisfied the administrative network policy.

On the other hand, if the network programming request was not successfully verified (i.e., violated one or more network filter/forward rules of the administrative network policy), then the operations of the VM are resumed with the original network configurations at the time of the programming request still in place at block 350. In some embodiments, the hypervisor may also inform the VM of why its network programming request was denied, if the network management agent has provided such a reason to the hypervisor.

Figure 4:
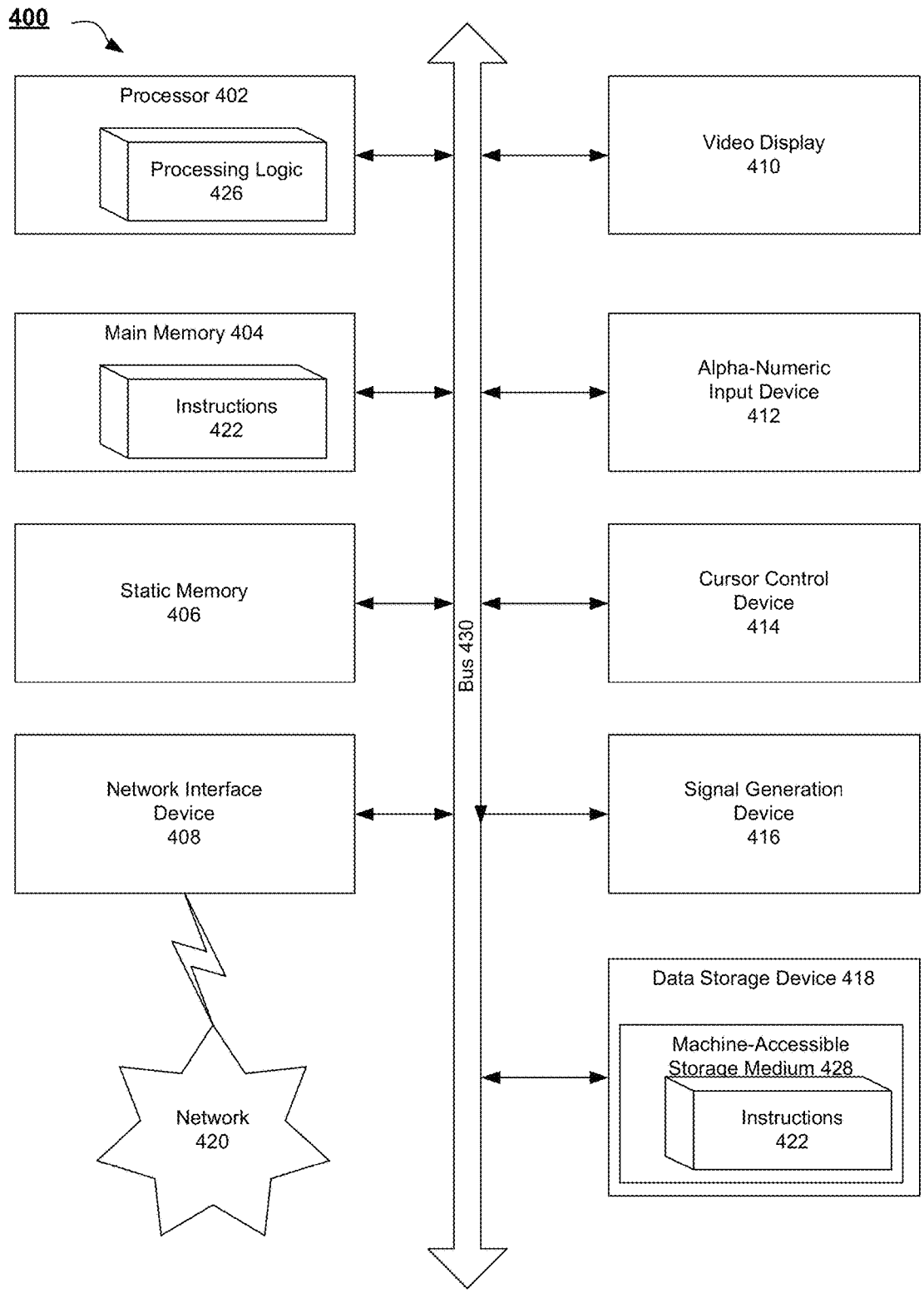
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform managed network filter/forward programming in a virtualization system by network management agent 107 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to store instructions to perform methods 200 and 300 for managed network filter/forward programming in a virtualization system described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   executing, by a processing device, a network management agent to perform network configuration modifications of a host machine, wherein the network configuration modifications comprise an update to network forwarding programming, and wherein the network management agent is separate from and more privileged than a hypervisor executing on the host machine that manages virtual machines (VMs) executed on the host machine;
   receiving, by the network management agent, a network programming request to update network configuration settings to a virtual network device of the host machine, the network programming request received from the hypervisor, wherein the hypervisor intercepts the network programming request from one of the VMs executed on the host machine, and wherein the network management agent is separate from the virtual network device and configuration tables corresponding to the virtual network device;
   determining, by the processing device executing the network management agent, whether the network programming request satisfies an administrative network policy of a virtualization network of the VM; and
   updating, by the network management agent, the network configuration settings for the VM at the virtual network device as requested by the network programming request in response to determining that the network programming request satisfies the administrative network policy, wherein the updating occurs without restarting the VM;
   wherein the configurations tables maintain filtering and forwarding information and are modified by using the network programming request that is sent from the VM, and are not modified by using learning/snooping on traffic from the VM.

2. The method of claim 1, wherein the administrative network policy comprises one or more network filter programming rules to apply to network traffic in a virtualization system that comprises the VM.

3. The method of claim 2, wherein the network filter rules comprise at least one of a rule regarding Media Access Control (MAC) addresses that are allowed for the VM, a rule designating one or more virtual local area network (VLAN) addresses to the VM, a rule regarding multicasting and uni-casting from the VM, or a rule disallowing any addressing conflicts between the VM and any other VMs on a host machine hosting the VM.

4. The method of claim 3, wherein the virtual network device enables the VM to transmit and receive network traffic over a network communicably coupled to the host machine and with one or more other VMs on the same host machine as the VM.

5. The method of claim 3, wherein the network management agent is more privileged than the host machine with respect to network configuration policies of the VM.

6. The method of claim 1, wherein the administrative network policy comprises one or more network forwarding programming rules to apply to received packets at one or more host machines in a virtualization system that comprises the VM.

7. The method of claim 1, wherein updating the network configuration settings further comprises updating network configuration settings in a virtual network device on a host machine hosting the VM.

8. The method of claim 1, further comprising ignoring the network programming request in response to determining that the network programming request does not satisfy the administrative network policy.

9. A system, comprising:
   a memory;
   a processing device communicably coupled to the memory, the processing device to execute a network management agent to perform network configuration modifications of a host machine, wherein the network configuration modifications comprise an update to network forwarding programming, and wherein the network management agent is separate from and more privileged than a hypervisor executing on the host machine that manages virtual machines (VMs) executed on the host machine,
   wherein the processing device is to:
      receive a network programming request to perform network configuration changes to a virtual network device of the host machine, the network programming request received from the hypervisor, wherein the hypervisor intercepts the network programming request from one of the VMs executed on the host machine, and wherein the network management agent is separate from the virtual network device and configuration tables corresponding to the virtual network device;
      determine whether the network programming request satisfies an administrative network policy of a virtualization network of the VM; and update network configuration settings for the VM at the virtual network device as requested by the network programming request in response to determining that the network programming request satisfies the administrative network policy, wherein the update occurs without restarting the VM;

wherein the configuration tables maintain filtering and forwarding information and are modified by using the network programming request that is sent from the VM, and are not modified by using learning/snooping on traffic from the VM.

10. The system of claim 9, wherein the administrative network policy comprises one or more network filtering programming rules to apply to network traffic in a virtualization system that comprises the VM.

11. The system of claim 10, wherein the network filter rules comprise at least one of a rule regarding Media Access Control (MAC) addresses that are allowed for the VM, a rule designating one or more virtual local area network (VLAN) addresses to the VM, a rule regarding multicasting and uni-casting from the VM, or a rule disallowing any addressing conflicts between the VM and any other VMs on a host machine hosting the VM.

12. The system of claim 11, wherein the virtual network device enables the VM to transmit and receive network traffic over a network communicably coupled to the host machine and with one or more other VMs on the same host machine as the VM.

13. The system of claim 9, wherein the administrative network policy comprises one or more network forwarding programming rules to apply to received packets at one or more host machines in a virtualization system that comprises the VM.

14. The system of claim 9, wherein to update the network configuration settings, the processing device is to update network configuration settings in a virtual network device on a host machine hosting the VM.

15. A non-transitory machine-readable storage medium comprising instructions that, when accessed by a processing device, causes the processing device to:

execute, by the processing device, a network management agent to perform network configuration modifications of a host machine, wherein the network configuration modifications comprise an update to network forwarding programming, and wherein the network management agent is separate from and more privileged than a hypervisor executing on the host machine that manages virtual machines (VMs) executed on the host machine;

receive, by the network management agent, a network programming request to perform network configuration changes to a virtual network device of the host machine, the network programming request received from the hypervisor, wherein the hypervisor intercepts the network programming request from one of the VMs executed on the host machine, and wherein the network management agent is separate from the virtual network device and configuration tables corresponding to the virtual network device;

determine, by the network management agent, whether the network programming request satisfies an administrative network policy of a virtualization network of the VM; and update, by the network management agent, network configuration settings for the VM at the virtual network device as requested by the network programming request in response to determining that the network programming request satisfies the administrative network policy, wherein the updating occurs without restarting the VM;

wherein the configuration tables maintain filtering and forwarding information and are modified by using the network programming request that is sent from the VM, and are not modified by using learning/snooping on traffic from the VM.

16. The non-transitory machine-readable storage medium of claim 15, wherein the administrative network policy comprises one or more network filter rules to apply to network traffic in a virtualization system that comprises the VM.

17. The non-transitory machine-readable storage medium of claim 16, wherein the network filter rules comprise at least one of a rule regarding Media Access Control (MAC) addresses that are allowed for the VM, a rule designating one or more virtual local area network (VLAN) addresses to the VM, a rule regarding multicasting and uni-casting from the VM, or a rule disallowing any addressing conflicts between the VM and any other VMs on a host machine hosting the VM.

18. The non-transitory machine-readable storage medium of claim 15, wherein the administrative network policy comprises one or more network forwarding programming rules to apply to received packets at one or more host machines in a virtualization system that comprises the VM.

19. The non-transitory machine-readable storage medium of claim 15, wherein to update the network configuration settings, the processing device is further to update network configuration settings in a virtual network device on a host machine hosting the VM.

* * * * *